United States Patent
Koizumi

(10) Patent No.: US 6,678,538 B1
(45) Date of Patent: Jan. 13, 2004

(54) POWER SUPPLY METHOD AND POWER SUPPLY DEVICE FOR PORTABLE TELEPHONE

(75) Inventor: Fumiaki Koizumi, Tokyo (JP)

(73) Assignee: NEC Corporation, Tokyo (JP)

(*) Notice: Subject to any disclaimer, the term of this patent is extended or adjusted under 35 U.S.C. 154(b) by 697 days.

(21) Appl. No.: 09/615,483

(22) Filed: Jul. 13, 2000

(30) Foreign Application Priority Data

Jul. 22, 1999 (JP) .......................................... 11/207256

(51) Int. Cl.$^7$ .............................. H04B 1/38; H04M 1/00
(52) U.S. Cl. ...................... 455/574; 455/572; 455/404; 455/566
(58) Field of Search ................................ 455/574, 572, 455/404.1, 405, 422.1, 423, 425, 414.2, 565, 566, 343.1, 343.4, 343.5, 127.5, 127.6, 127.7, 127.1

(56) References Cited

U.S. PATENT DOCUMENTS

| | | | |
|---|---|---|---|
| 5,278,995 A | | 1/1994 | Hwang |
| 5,726,636 A | * | 3/1998 | Hayes, Jr. ................. 340/636.1 |
| 6,427,072 B1 | * | 7/2002 | Reichelt ................... 455/404.1 |
| 2002/0077159 A1 | * | 6/2002 | Jiang ........................... 455/572 |

FOREIGN PATENT DOCUMENTS

| | | |
|---|---|---|
| GB | 2326566 | 12/1998 |
| GB | 2335569 | 9/1999 |
| GB | 2336955 | 11/1999 |
| JP | 5-28150 | 4/1993 |
| JP | 5-244733 | 9/1993 |
| JP | 9-93313 | 4/1997 |
| JP | 9-139981 | 5/1997 |
| JP | 9-172402 | 6/1997 |
| JP | 9-205396 | 8/1997 |
| JP | 2775105 | 5/1998 |
| JP | 10-209953 | 8/1998 |
| JP | 10-232272 | 9/1998 |
| JP | 10-289038 | 10/1998 |
| JP | 11-177481 | 7/1999 |

OTHER PUBLICATIONS

U.K. Search Report issued Jan. 26, 2001 in a related application (in English).
Copy of Japanese Office Action dated Mar. 4, 2003 (and English translation of relevant portion).

* cited by examiner

Primary Examiner—Nay Maung
Assistant Examiner—Edan Orgad
(74) Attorney, Agent, or Firm—Dickstein, Shapiro, Morin & Oshinsky, LLP.

(57) ABSTRACT

The remaining level of a battery 9 is detected, and when the remaining level is lower than a specified value, supply of power is stopped to other circuits except necessary circuits 5, 7, 10 that need electric power for reading out a telephone number from a telephone number memory 13 and displaying the read out telephone number. Only the telephone directory function is remaining, and if the battery is spend and the portable telephone can not be used, at least a worst case of impossibility of any operation can be avoided. The specified value is a voltage level at which it is usually difficult to transmit and receive. The necessary circuits include the telephone number memory 13 and the display unit 7 for displaying the telephone number. It is further preferred to display it is impossible to transmit and receive, and possible to display the telephone number.

13 Claims, 7 Drawing Sheets

POWER SUPPLY METHOD AND POWER SUPPLY DEVICE FOR PORTABLE TELEPHONE

BACKGROUND OF THE INVENTION

1. Field of the Invention

The present invention relates to a power supply method and a power supply device for a portable telephone such as a cellular phone (or cordless telephone), and more particularly to a power supply method and a power supply device for a portable telephone having measures against voltage drop making it difficult to transmit and receive.

2. Description of the Related Art

The telephone number memory of a portable telephone can not be referred to if the battery is used up. When going out, the telephone number memory of the portable telephone is often an only telephone directory for the user of the portable telephone. If the communication function of the portable telephone does not work, there is other communication means such as pay phone, but if the portable telephone is the only telephone directory, there is no other means of knowing the telephone number, and the user cannot make a call.

If the battery is spent or the battery voltage level is lowered, it is inevitable that communication cannot be made with the portable telephone, but it is desired to be continuously allowed to refer to the telephone number memory.

A related prior art disclosed in Japanese Laid-Open Patent Application (JP-A-Heisei, 5-244733) teaches "POWER SOURCE CHANGEOVER DEVICE FOR PORTABLE TELEPHONE". In this power source changeover device, usually, the changeover means is feeding the supply voltage of the main battery to the logic circuit and communication circuit. When the output voltage of the main battery drops, a voltage drop signal is issued from the voltage monitoring means and the changeover means changes over the supply of power source from the main battery to the sub battery. When changed over to the sub battery, power supply to the communication circuit is cut off by the power cut-off means. As a result, even if the voltage of the main battery drops, only the logic function can be used.

Japanese Laid-Open Patent Application (JP-A-Heisei, 9-172402) discloses "BATTERY SAVING DEVICE FOR A MOBILE WIRELESS APPLIANCE". In this battery saving device, the power source is supplied from the battery to the telephone set circuit through a switch circuit unit, and the remaining level of the battery is detected by a remaining level detector, and when the remaining level reaches 5% (equivalent to 5-minute talk), the controller turns off the switch in the switch circuit unit, and the power source of the battery is not supplied into the telephone set circuit. The manual switch is usually set in ON position. Therefore the battery remainder equivalent to 5-minute talk can be reserved, and it avoids the case of impossibility of use due to complete discharge of battery if attempted to use portable telephone.

Japanese Laid-Open Patent Application (JP-A-Heisei, 9-139981) discloses "PORTABLE TELEPHONE AND A PORTABLE IMAGE COMMUNICATION TERMINAL DEVICE". The device comprises an EEPROM which stores the caller's telephone number when talking and maintains the stored caller's telephone number if the communication is interrupted due to battery consumption in the portable telephone, and a controller which reads out the telephone number from the EEPROM and displays on the screen of a display unit when the power source is recovered by replacing the battery if the communication is interrupted due to battery consumption in the portable telephone.

Japanese Laid-Open Patent Application (JP-A-Heisei, 10-289038) discloses "PORTABLE INFORMATION TERMINAL DEVICE". In this device, a constant voltage circuit issues plural reference voltages. A comparator compares the plural reference voltages and the supply voltage of the battery, and issues a comparison signal corresponding to the supply voltage of the battery. A controller, according to the comparison signal, controls the supply voltage supplied to the transmitting and receiving circuit and voice talk circuit, and the supply voltage supplied to the video processing circuit, video display unit and back-light by controlling with the power source changeover switch. It hence prevents sudden interruption of communication when the battery remaining level decreases.

Japanese Patent No. 2775105 discloses "LIQUID CRYSTAL DISPLAY DEVICE". In this liquid crystal display device, when driving a back-light liquid crystal display unit by battery, drop of battery voltage is detected and displayed by alarm. More specifically, it comprises the back-light, a back-light driving circuit, battery voltage detecting means, drive controlling means for issuing a control signal to the driving circuit depending on the result of detection by this detecting means, and issuing a control signal for stopping the driving circuit when the detecting means detects that the battery voltage is lower than a predetermined value, and invalidating means for invalidating the control signal of the drive controlling means for a predetermined time when the power source is turned on and operating the driving circuit.

SUMMARY OF THE INVENTION

It is hence an object of the present invention to present a power supply method and a power supply device for a portable telephone capable of referring always to at least the telephone number memory only.

Means for achieving the object is expressed as follows. Technical matters appearing in the expression are indicated by numerals and symbols enclosed in parentheses "( )". The numerals and symbols coincide with the technical matters for composing at least one embodiment or example out of plural embodiments and examples of the present invention, in particular the reference numerals and reference symbols given to technical matters expressed in the drawing corresponding to the embodiment or example. Such reference numerals and reference symbols clarify the correspondence or relation between the technical matters in the claims and the technical matters in the embodiment or example. Such correspondence or relation does not mean that the technical matters in the claims are interpreted as being limited in the technical matters in the embodiment or example.

The power supply method for a portable telephone according to the present invention comprises the steps of detecting the remaining level of a battery (9), and stopping power supply to other circuits corresponding to a first group of circuits except necessary circuits (5, 7) corresponding to a second group of circuits that need electric power for reading telephone number from a telephone number memory (13) and displaying the read out telephone number when the remaining level is lower than a specified value. The other circuit does not mean all circuits except the necessary circuits that needs electric power. The other circuits are preferred not to include circuits consuming a very small amount of power for a very short time for operating indispensable parts in case of emergency such as the back-light and the display circuit as described later. Only the telephone directory function is remaining, and it avoids a worst case of impossibility of any operation due to drop of battery level and failure of function of portable telephone.

The specified value is usually a voltage level at which it is difficult to transmit and receive, in other word, the portable telephone can not carry out a transmitting and a receiving operation, and substantially it is the telephone function losing voltage. The necessary circuits include the telephone number memory (13) and a display unit (7) to display a telephone number. It is further preferred to include a display for notifying that it is impossible to transmit and receive but possible to display a telephone number.

When the remaining level is lower than the specified value, it is preferred to change over or switch the power source from a battery (main battery) to a spare battery (11). Provision of the spare battery (11) securely avoids an occurrence of such a case that the function of the telephone directory becomes inoperative. In this case, the specified value may be a voltage level at which the portable telephone can not carry out a transmitting and a receiving operation and a calling operation of a telephone number, so that the electric power in the main battery can be used up without fear. When the remaining level becomes lower than the specified value, it is preferred not to drive a back-light (22).

The power supply device for a portable telephone according to the present invention comprises a telephone number memory (13), a battery (9), a telephone controller (5), and a battery remaining level detector (10) which is connected to the telephone controller (5) to monitor the output voltage V of the battery for always detecting the remaining level of the battery (9). The telephone controller (5) includes a controller for stopping power supply to other circuits (2, 3, 4) corresponding to a first group of circuits except necessary circuits corresponding to a second group of circuits that need electric power for reading a telephone number from the telephone number memory (13) and displaying the read out telephone number when the battery remaining level drops below a specified value.

Further, the power supply device includes a backlight (22), the telephone controller (5) is also preferred to include a controller for not driving the back-light (22) when the battery remaining level drops below the specified value. Moreover, the power supply device includes an emergency switch (15) for driving the back-light in case of emergency, it is preferred to drive the back-light (22) by the emergency switch (15) even after the telephone controller (5) has controlled not to drive the back-light (22).

DESCRIPTION OF THE PREFERRED EMBODIMENTS

Figure 1:
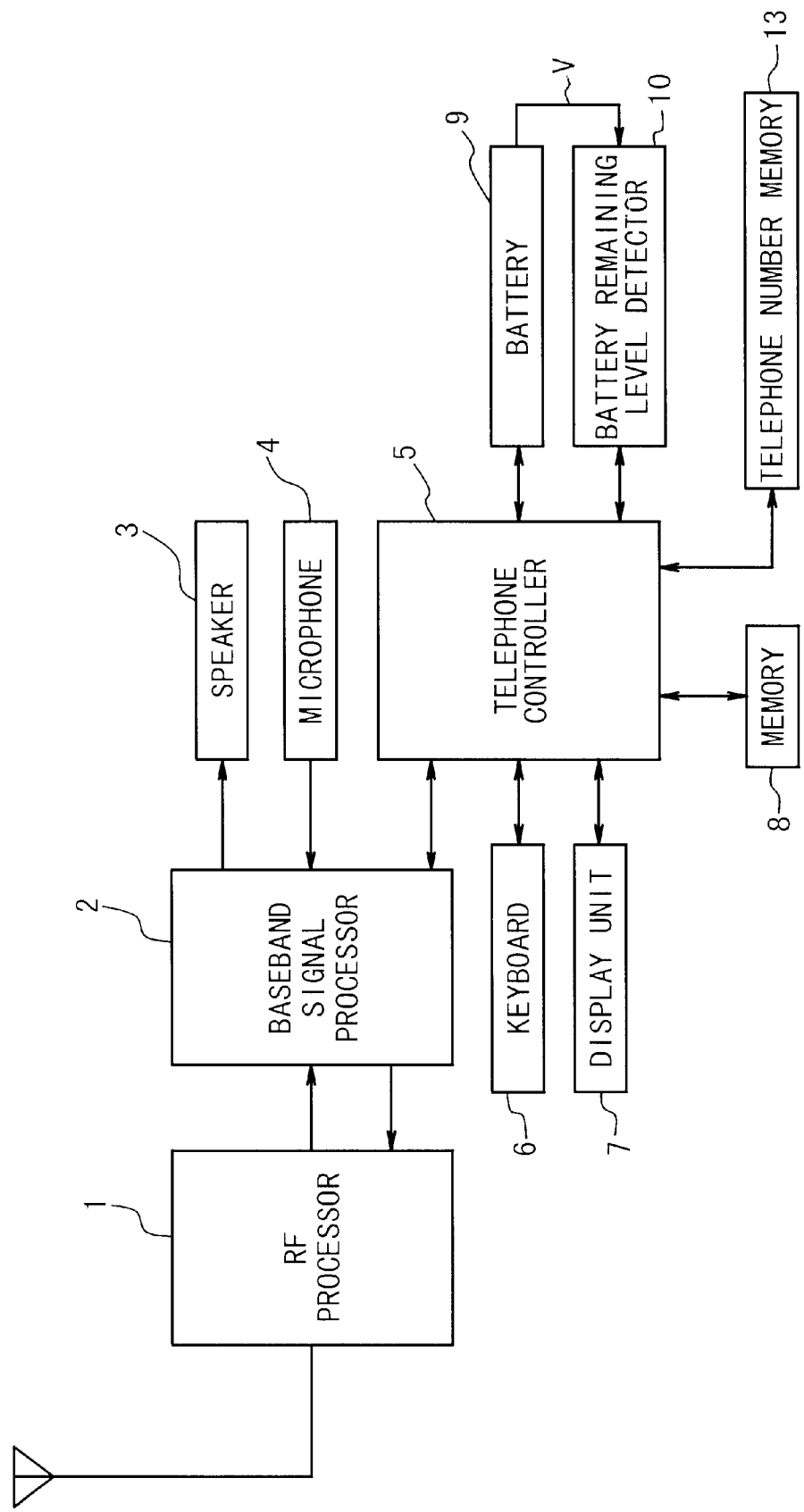
FIG. 1 is a circuit block diagram showing an embodiment of a power supply device for a portable telephone according to the present invention.

Coinciding with and corresponding to the drawings, an embodiment of a power supply device for a portable telephone of the present invention includes an RF processor 1. The RF processor 1, as shown in FIG. 1, processes a reception signal by RF processing, demodulates and converts it into a reception base-band signal, and modulates a base-band signal for transmission to convert into a transmission signal, and transmits it. The RF processor 1 is connected to a base-band signal processor 2 in two directions.

The base-band signal processor 2 picks up reception data from the reception base-band signal received from the RF processor 1, and generates audio signals from the reception data, and reproduces sound through a speaker 3. The base-band signal processor 2 generates a base-band signal for transmission from the sound entered through a microphone 4.

A telephone controller 5 is connected to the base-band signal processor 2 in two directions. The telephone controller 5 controls the entire of the portable telephone, the controlling includes a series of transmitting and receiving process mentioned above. A telephone number memory 13 connected to the telephone controller 5 stores plural telephone numbers. The telephone numbers are recorded in relation to the name, number, group name, group number, etc., and can be called by them.

A battery remaining level detector 10 connected to the telephone controller 5 monitors the output voltage V of a battery 9 connected thereto, and is always observing the remaining level of the battery 9. When the output voltage V becomes lower than a predetermined keep-talk voltage Vk1, it is judged that the battery remaining level is not sufficient, and a battery alarm signal is issued to the telephone controller 5. As the predetermined keep-talk voltage Vk1, such an output voltage is employed that has enough remainder for supply power to operate part of the telephone controller 5, telephone number memory 13 and display unit 7 although it is difficult to continue to transmit and receive.

Figure 2:
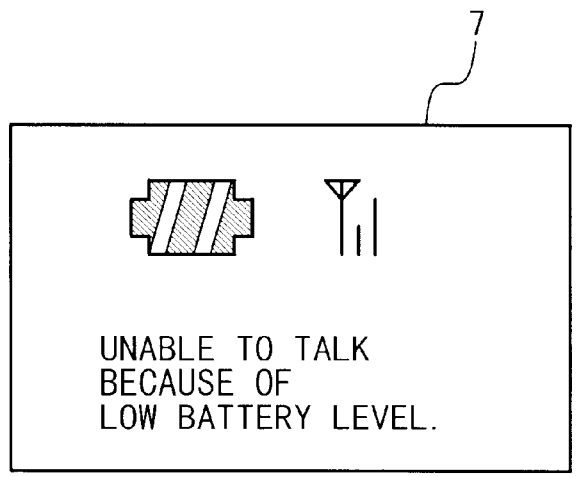
FIG. 2 is a plan view showing a display example.
Figure 3:
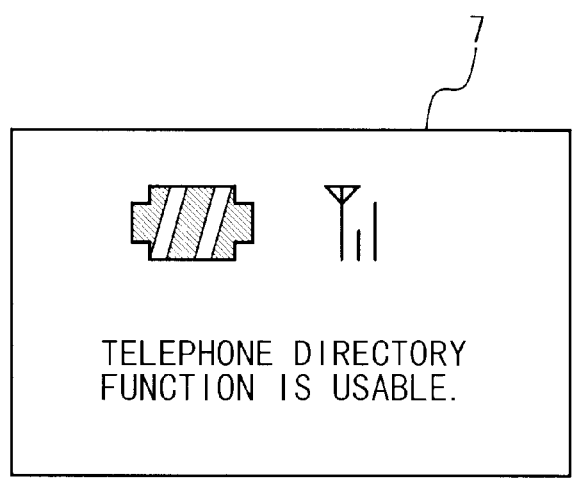
FIG. 3 is a plan view showing another display example.

The telephone controller 5, when receiving the battery alarm signal from the battery remaining level detector 10, stops a series of transmitting and receiving process, and displays a message as shown in FIG. 2 telling talk is disabled in a display unit 7. It further displays as shown in FIG. 3 telling the data recorded in the telephone number memory 13 can be referred to in the display unit 7.

The display also shows "Telephone directory function is usable", the telephone directory function means that the data recorded in the telephone number memory 13 can be referred to. After such a displaying operation, the telephone controller 5 cuts off the power supply to the parts except for a part of the telephone controller 5, the telephone number memory 13 and the display unit 7, and is transferred to the telephone number memory operation mode, allowing only to refer to the data recorded in the telephone number memory 13.

Figure 4:
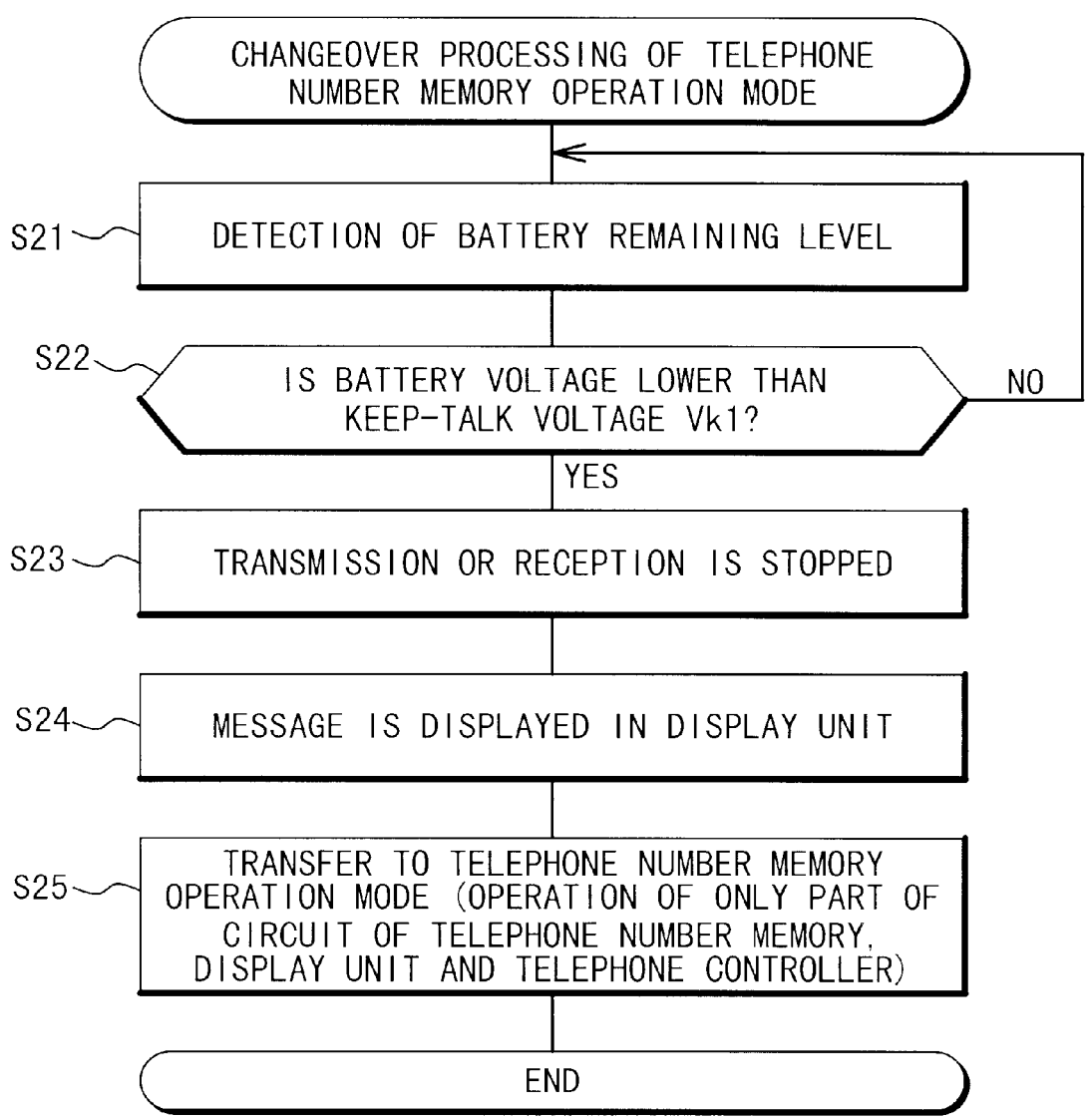
FIG. 4 is an operation flow diagram showing an embodiment of a power supply device for a portable telephone according to the present invention.

FIG. 4 shows the operation mode changeover process of the telephone number memory in the power supply method for the portable telephone according to the present invention. The battery remaining level is always detected (step S21), and the output voltage V of the battery 9 and the keep-talk voltage Vk1 are compared (step S22). When the battery output voltage V is higher than the keep-talk voltage Vk1, returning to the initial step, the detection is executed all the time. When the battery output voltage V is lower than the keep-talk voltage Vk1, the transmitting and receiving process is stopped (step S23), and messages shown in FIG. 2 and FIG. 3 are displayed in the display unit (step S24), thereby transferring to the telephone number memory operation mode (step S25).

Figure 5:
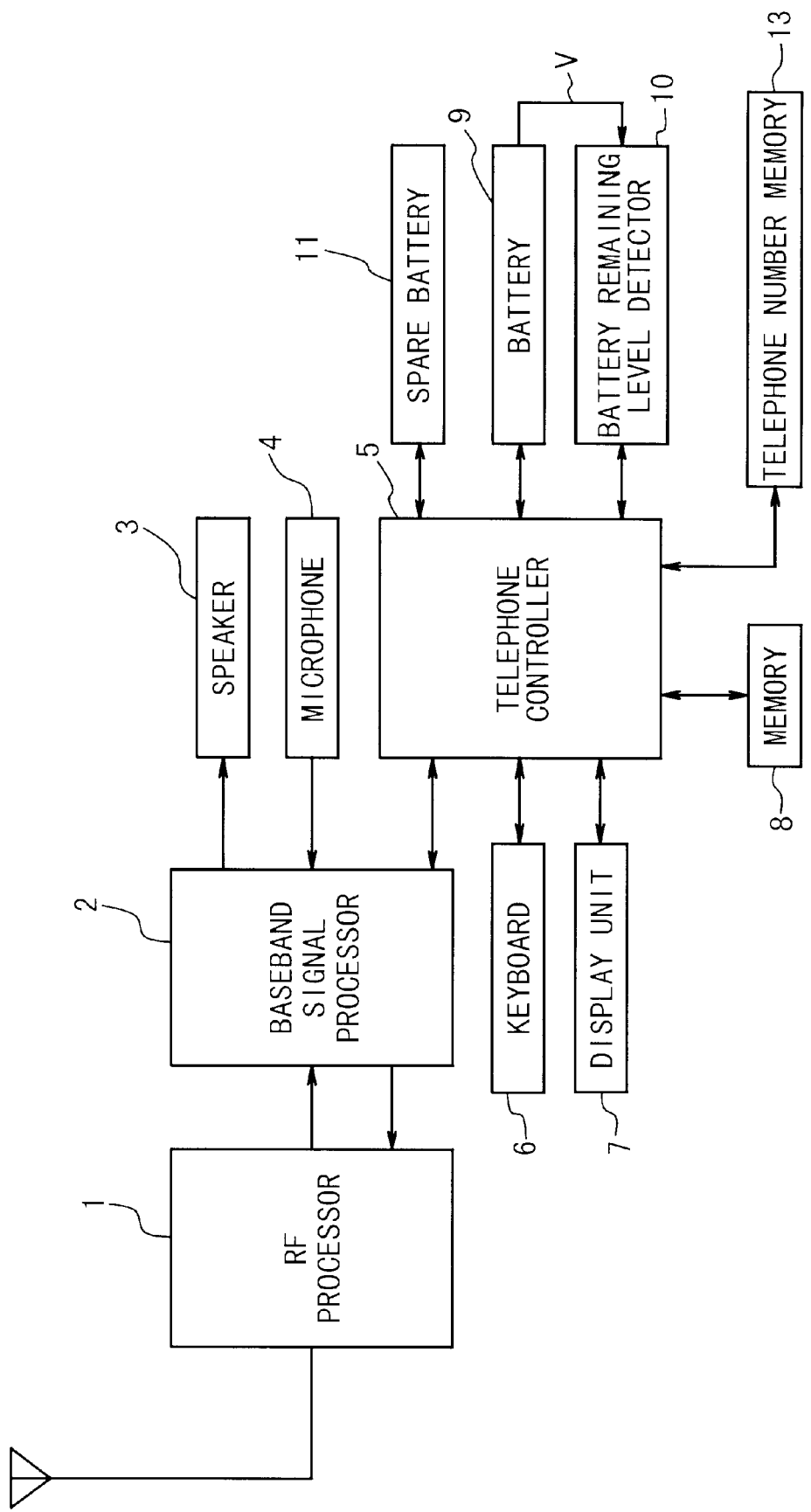
FIG. 5 is a circuit block diagram showing other embodiment of a power supply device for a portable telephone according to the present invention.

FIG. 5 shows another embodiment of the present invention. A spare battery 11 is additionally provided. The spare battery 11 is connected to the telephone controller 5. The battery remaining level detector 10 monitors the output voltage V of the battery 9, and observes the remaining level of the battery 9. When the output voltage V becomes lower than a predetermined keep-talk voltage Vk2, it is judged that the battery remaining level is not sufficient, and a battery alarm signal is issued to the telephone controller 5.

The predetermined keep-talk voltage Vk2 is set at a lower voltage than the keep-talk voltage Vk1 in the preceding embodiment. As the predetermined keep-talk voltage Vk2, such an output voltage is employed that has a battery remaining level difficult to continue to transmit and receive and not enough for supply power to operate a part of the telephone controller 5, the telephone number memory 13 and the display unit 7.

The telephone controller 5, when receiving a battery alarm signal from the battery remaining level detector 10, stops a series of transmitting and receiving process, and changes over or switches the power source of the portable telephone from the battery 9 to the spare battery 11. A message as shown in FIG. 2 telling talk is disabled is shown in the display unit 7, and further a message as shown in FIG. 3 telling the data recorded in the telephone number memory 13 can be referred to is shown in the display unit 7.

Figure 6:
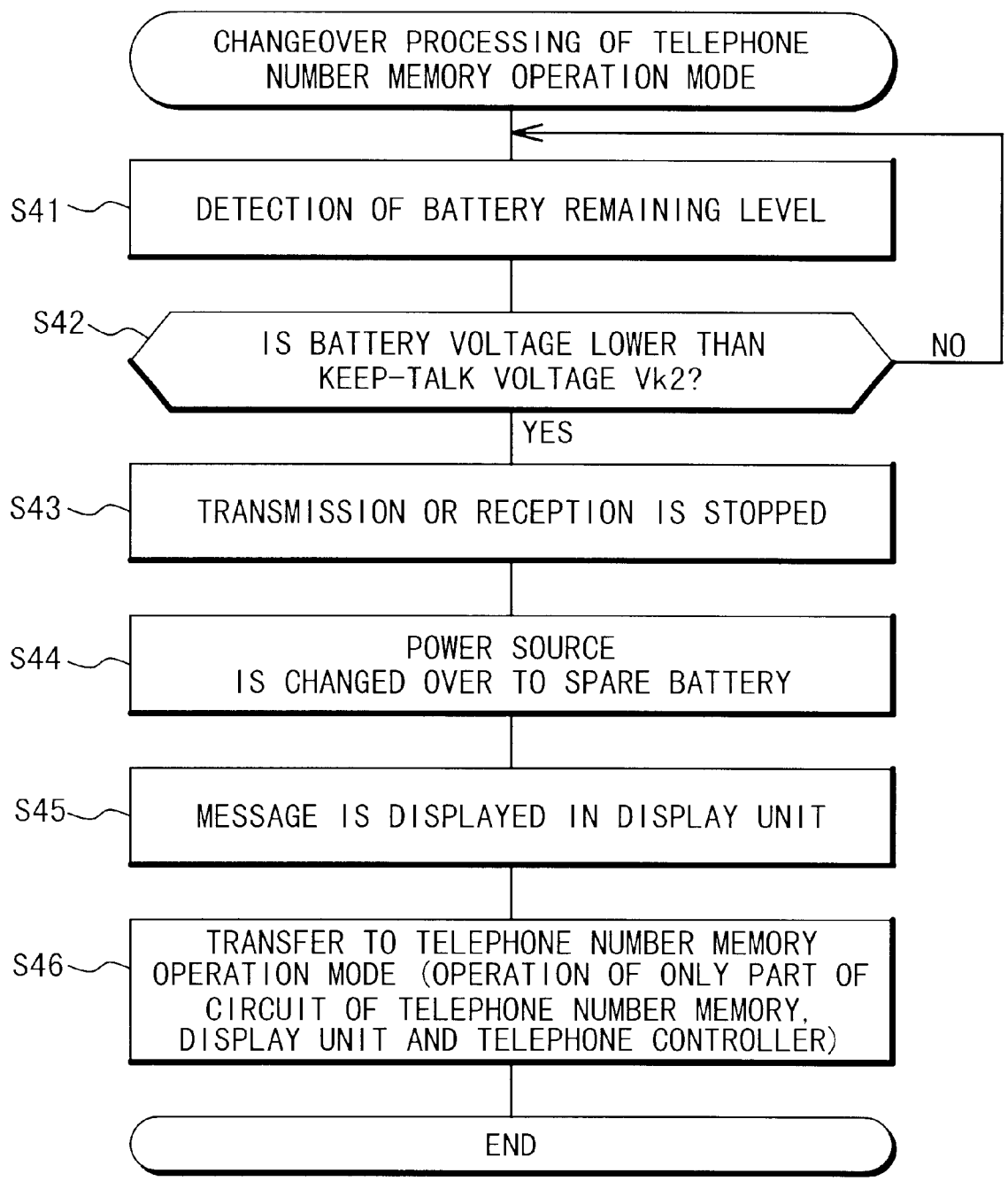
FIG. 6 is an operation flow diagram showing the other embodiment of a power supply device for a portable telephone according to the present invention.

After such a display operation, the telephone controller 5 cuts off the power supply to the parts except for part of the telephone controller 5, telephone number memory 13 and display unit 7, and is transferred to the telephone number memory operation mode, allowing only to refer to the data recorded in the telephone number memory 13. FIG. 6 shows the operation mode changeover process of telephone number memory. The battery remaining level is detected (step S41), and the output voltage V of the battery and the keep-talk voltage Vk2 are always compared (step S42), and when the battery output voltage V is higher than the keep-talk voltage Vk2, the process returns to the initial step.

When the battery output voltage V is lower than the keep-talk voltage Vk2, the transmitting and receiving process is stopped (step S43), the power source of the portable telephone is changed over from the battery 9 to the spare battery 11 (step S44), and messages are displayed in the display unit (step S45), thereby transferring to the telephone number memory operation mode (step S46).

Figure 7:
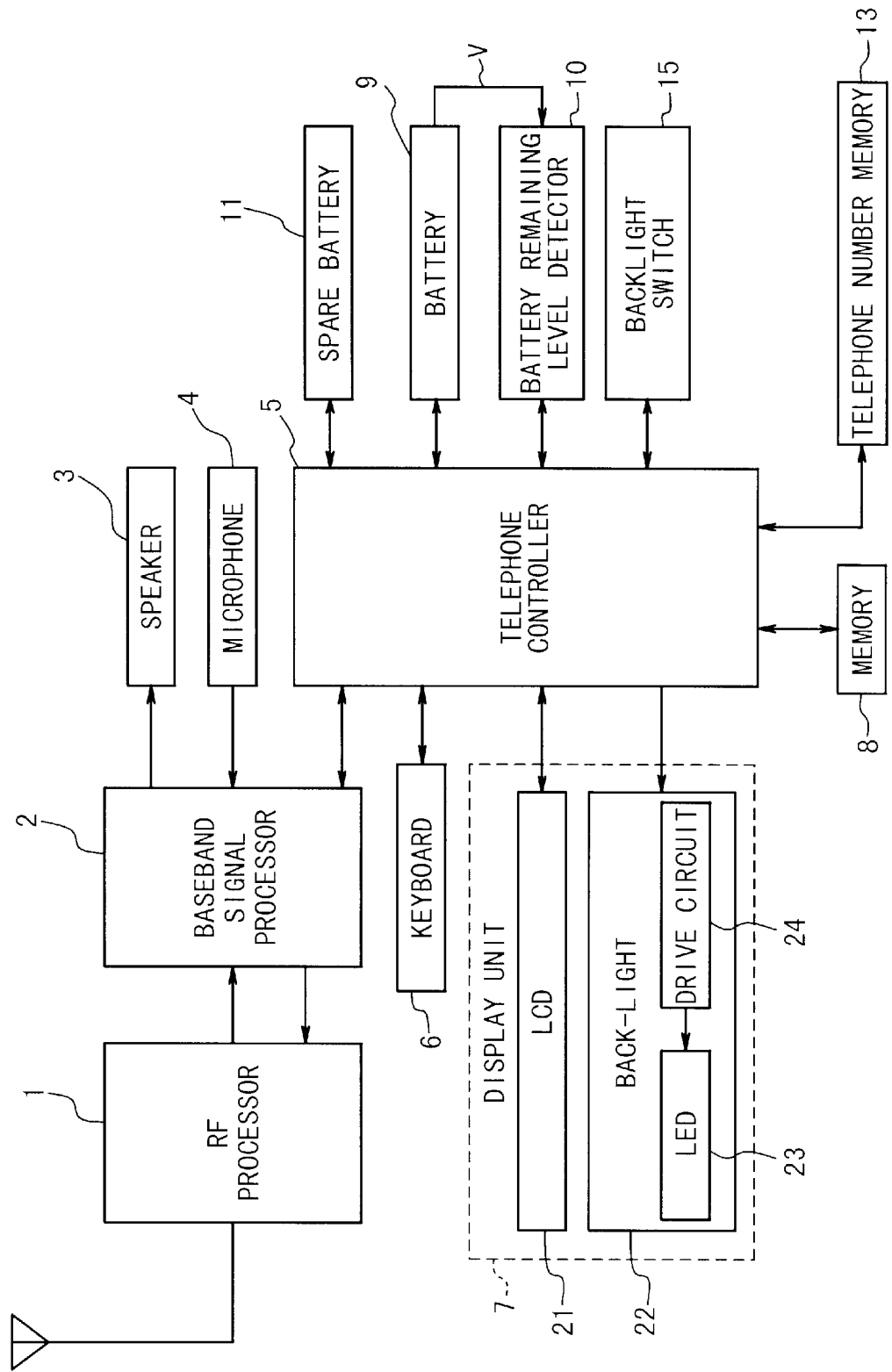
FIG. 7 is a circuit block diagram showing a further embodiment of a power supply device for a portable telephone according to the present invention.

FIG. 7 shows a further embodiment of power supply device for a portable telephone of the present invention. A back-light switch 15 is additionally provided. The display unit 7 incorporates an LCD 21 and back-light 22 in the inside. The back-light 22 is composed of an LED 23 and a drive circuit 24. The LED 23 is a light emitting diode. The drive circuit 24 supplies current to the LED 23 through the telephone controller 5, and illuminates the LED 23. The current consumption of the back-light 22 is mainly the current flowing in the LED 23, and about scores of mA is consumed.

The battery remaining level detector 10 monitors the output voltage V of the battery 9, and observes the remaining level of the battery 9. When the output voltage V becomes lower than a preset keep-talk voltage Vk2, it is judged that the battery remaining level is not sufficient, and a battery alarm signal is issued to the telephone controller 5. The telephone controller 5, when receiving a battery alarm signal from the battery remaining level detector 10, stops a series of transmitting and receiving process, and changes over or switches the power source of the portable telephone from the battery 9 to the spare battery 11. A message telling talk is disabled is shown in the display unit 7 as mentioned above, and further a message telling the data recorded in the telephone number memory 13 can be referred to is shown in the display unit 7 also as mentioned above.

The telephone controller 5 controls the drive circuit 22 so as not to drive the back-light 22 if the keyboard is pressed, that is, to get into the back-light non-lighting mode. The back-light switch 15 is intended to light up the back-light 22 in case of emergency in the back-light non-lighting mode. When the telephone controller 5 detects that the back-light switch 15 is pressed, the back-light 22 is lit for a specific time. After the specified time of lighting, the back-light 22 is put out by the control from the telephone controller 5.

In a conventional portable telephone, it has been controlled to put out the back-light when key input is not occurred for about 15 seconds in order to save current consumption, but in the present invention, to save the current consumption ultimately in the telephone number memory operation mode, the back-light is not lit if the key input is occurred. If lighting of the back-light is particularly needed, the back-light switch 15 may be used intentionally.

Then the battery controller 5 cuts off the power supply to the parts except for a part of the telephone controller 5, the telephone number memory 13 and the display unit 7, and is transferred to the telephone number memory operation mode, allowing only to refer to the data recorded in the telephone number memory 13.

Figure 8:
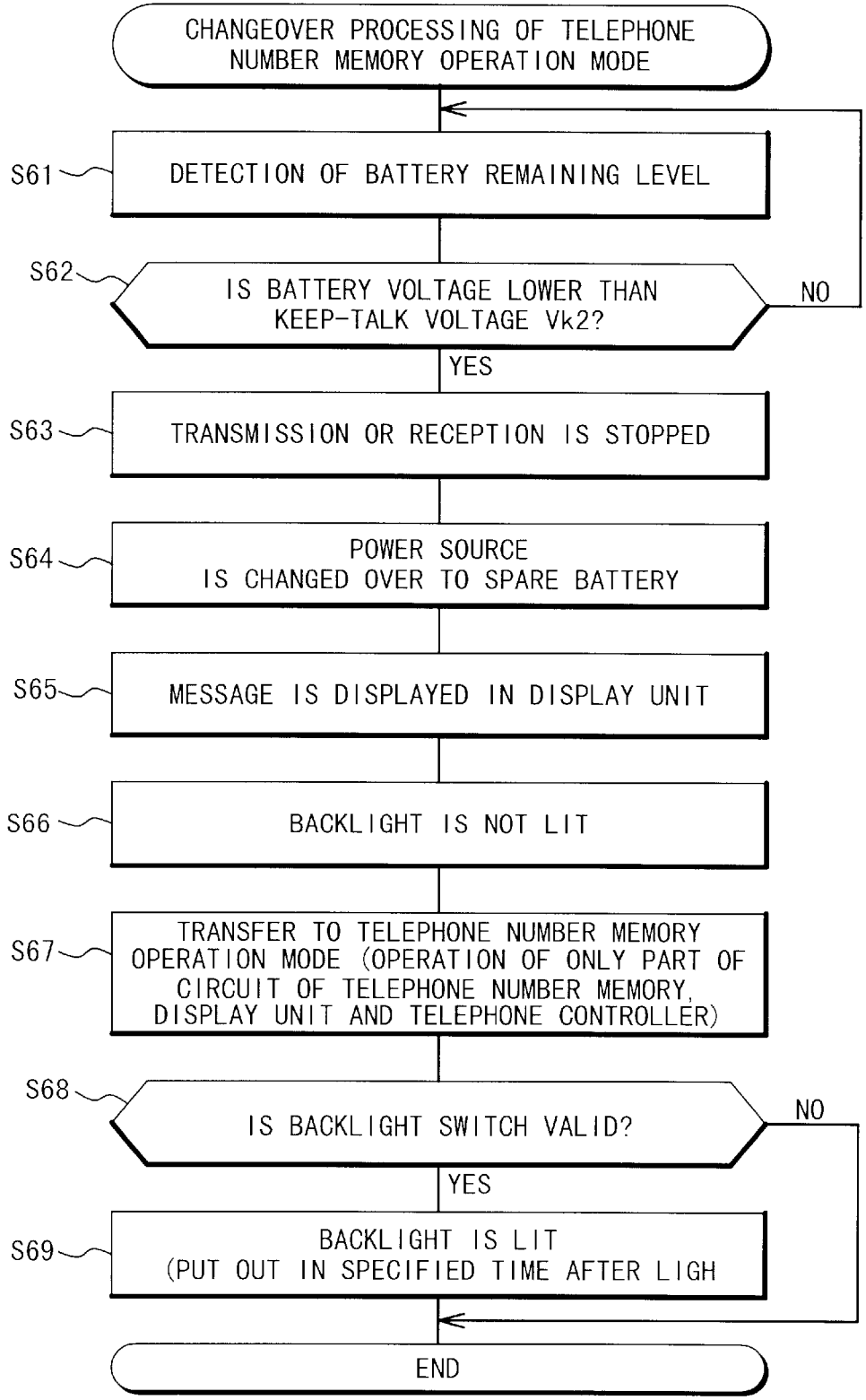
FIG. 8 is an operation flow diagram showing the further embodiment of a power supply device for a portable telephone according to the present invention.

FIG. 8 shows the operation mode changeover process of telephone number memory shown in FIG. 7. The battery remaining level is detected (step S61). The output voltage V of the battery 9 and the keep-talk voltage Vk2 are compared (step S62). When the battery output voltage V is higher than the keep-talk voltage Vk2, the process returns to the initial step. When the battery output voltage V is lower than the keep-talk voltage Vk2, the transmitting and receiving process is stopped (step S63), and the power source of the portable telephone is changed over from the battery 9 to the spare battery 11 (step S64).

Displaying messages in the display unit (step S65), it is transferred to back-light non-lighting mode so as not to drive the back-light if key input is made (step S66). It is then transferred to the telephone number memory operation mode (step S67). Herein, it is judged if the back-light switch 15 is valid or not (step S68), if valid, the back-light is lit. The back-light is put out in a certain time after lighting (step S69). If the back-light switch is not valid, the process returns to the initial step.

According to the power supply method and power supply device for a portable telephone according to the present invention, when the battery remaining level is low and talk is disabled, it is controlled to operate the telephone number memory by the slight electric power left over in the battery, so that the telephone number memory can be referred to continuously.

What is claimed is:

1. A power supply method for a portable telephone comprising:

detecting a remaining level of a battery; and stopping power supply to a first group of circuits of said portable telephone when the detected remaining level is lower than a specified value, wherein a second group of circuits of said portable telephone is used to read out a telephone number from a telephone number memory and to display the read out telephone number, and said first group of circuits is circuits of said portable telephone other than said second group of circuits of said portable telephone.

2. The power supply method for a portable telephone according to claim 1, wherein said specified value is a voltage level at which said portable telephone can not carry out a transmitting and a receiving operation.

3. The power supply method for a portable telephone according to claim 2, wherein said second group of circuits include the telephone number memory and a display unit for displaying the read out telephone number.

4. The power supply method for a portable telephone according to claim 2, further comprising:

displaying a message to notify that said portable telephone can not carry out a transmitting and a receiving operation; and displaying a message to notify that said portable telephone can display the telephone number.

5. The power supply method for a portable telephone according to claim 1, further comprising:

switching a power source from said battery to a spare battery when said remaining level is lower than said specified value, wherein said specified value is a voltage level at which said portable telephone can not carry out a transmitting and a receiving operation and a calling operation of a telephone number.

6. The power supply method for a portable telephone according to claim 1, further comprising:

not lighting a back-light when said remaining level is lower than said specified value.

7. A power supply device for a portable telephone comprising:

a telephone number memory;

a battery;

a telephone controller; and a battery remaining level detector connected to said telephone controller to monitor an output voltage of said battery for always detecting a remaining level of said battery, and wherein said telephone controller includes a controller for stopping power supply to a first group of circuits of said portable telephone when the detected remaining level is lower than a specified value, wherein a second group of circuits of said portable telephone is used to read out a telephone number from said telephone number memory and to display the read out telephone number, and said first group of circuits is circuits of said portable telephone other than said second group of circuits of said portable telephone.

8. The power supply device for a portable telephone according to claim 7, wherein said specified value is a voltage level at which said portable telephone can not carry out a transmitting and a receiving operation.

9. The power supply device for a portable telephone according to claim 8, wherein said second group of circuits include the telephone number memory and a display unit for displaying the read out telephone number.

10. The power supply device for a portable telephone according to claim 9, wherein said display unit displays a message to notify that said portable telephone can not carry out a transmitting and a receiving operation and displays a message to notify that said portable telephone can display the telephone number.

11. The power supply device for a portable telephone according to claim 7, wherein said telephone controller switches a power source from said battery to a spare battery when said remaining level detected by said battery remaining level detector is lower than said specified value, and wherein said specified value is a voltage level at which said portable telephone can not carry out a transmitting and a receiving operation and a calling operation of a telephone number.

12. The power supply device for a portable telephone according to claim 7, further comprising:

a back-light, wherein said telephone controller includes a controller for not lighting the back-light when the battery remaining level drops below said specified value.

13. The power supply device for a portable telephone according to claim 12, further comprising:

an emergency switch which lights said back-light in case of emergency, wherein said back-light can be lighted by said emergency switch even after said telephone controller has controlled not to light said back-light.

* * * * *